United States Patent [19]

Takaoka et al.

[11] Patent Number: 5,336,743

[45] Date of Patent: Aug. 9, 1994

[54] CAST RESIN FOR OPTICAL USE

[75] Inventors: Toshiaki Takaoka; Katsuyoshi Tanaka; Kenji Kato, all of Oita, Japan

[73] Assignee: NOF Corporation, Tokyo, Japan

[21] Appl. No.: 962,939

[22] Filed: Oct. 19, 1992

[30] Foreign Application Priority Data

Nov. 1, 1991 [JP] Japan .................. 3-288097
Nov. 1, 1991 [JP] Japan .................. 3-288099

[51] Int. Cl.$^5$ .................. C08F 18/18; C08F 18/24; C08F 222/26
[52] U.S. Cl. .................. 526/292.4; 526/314; 526/323
[58] Field of Search .................. 526/292.4, 314, 323

[56] References Cited

U.S. PATENT DOCUMENTS

| | | | |
|---|---|---|---|
| 4,801,667 | 1/1989 | Brand .................. | 526/314 |
| 4,855,374 | 8/1989 | Murata et al. .................. | 526/314 |

FOREIGN PATENT DOCUMENTS

| | | | |
|---|---|---|---|
| 0007787 | 1/1978 | Japan .................. | 526/314 |
| 0137150 | 8/1983 | Japan .................. | 526/314 |
| 0235501 | 10/1987 | Japan .................. | 526/292.4 |

*Primary Examiner*—Peter Szekely

*Attorney, Agent, or Firm*—Darby & Darby

[57] ABSTRACT

A cast resin for optical use is obtained by polymerizing a diallylphthalate component represented by the formula:

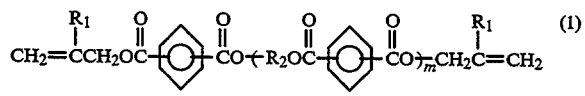

wherein —$R_1$ stands for a hydrogen atom or a methyl group, —$OR_2$ for a dihydric alcohol residue having 1-5 carbon atoms, and m for an integer of 0-20, with an alkyleneglycol bis-allylcarbonate component represented by the formula:

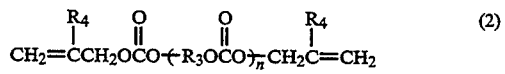

wherein —$R_4$ stands for a hydrogen atom or a methyl group, —$OR_3$ for a dihydric alcohol residue having 1-10 carbon atoms, and n for an integer of 1-10. In addition to the above components, there may be added a vinyl compound.

17 Claims, No Drawings

CAST RESIN FOR OPTICAL USE

BACKGROUND OF THE INVENTION

The present invention relates to a cast resin for optical use, and more particularly to a cast resin excellent in mechanical strength and various optical properties such as transparency and refractive index and thus utilizable in place of glass for various optical elements.

In recent years, a resinous lens is widely used in place of a conventional inorganic glass lens in the field of optical lenses because of its excellent useful properties such as impact-resistant, lightweight, moldable and dyeable properties. Ordinarily known as a material for such resinous lens is, for example, poly(methyl methacrylate), poly(diethylene glycol bis-allyl carbonate), polystyrene and a polycarbonate resin. In case of the poly(methyl methacrylate), and the poly(diethylene glycol bis-allyl carbonate) excellent in impact-resistance, lightweightness and moldability, however, they are so poor in refractive index as to have only about 1.49, and thus need a significant thickness as compared with the inorganic glass when employed as a lens. Accordingly, they are of disadvantage such that they are not suited for the purpose of manufacturing lenses of a high magnification or rendering the weight lighter. In case of the polystyrene and the polycarbonate resin, on the other hand, they have refractive index as high as 1.58–1.59 and are fully satisfactory in this respect. However, they are inherently thermoplastic in nature and thus have drawbacks such that they tend to show optical distortion caused by double refraction at the time of molding such as injection molding and are low in Abbe's number and that they are poor in solvent- and scratch-resistances regarded to be necessary for a substitute for glass lenses and show poor adhesivity to a hard coat film to be applied onto the surface of the lens to improve its surface hardness.

In order to overcome these drawbacks, various technical improvements have hitherto been proposed. In Japanese Laid-Open Patent Appln. No. Sho. 53-7787, for example, there is proposed a resinous glass made of a copolymer of diethyleneglycol bis-allylcarbonate and diallyl isophthalate. In Japanese Laid-open Patent Appln. No. Sho. 59-191708, there is proposed a resinous glass made of a copolymer of a diacrylate or dimethacrylate containing Bisphenol-A and diallyl phthalate with ethyleneglycol bis-allylcarbonate and the like. However, these resinous glasses have some problems in impact-resistance and have such a drawback that control of the reaction in the course of the polymerization is so difficult that the allyl monomers tend to remain unreacted due to difference in the rates of copolymerization, and moreover, the resultant copolymer is poor in weather-resistance.

Further, Japanese Laid-open Patent Applns. Nos. Sho. 62-235901 and 64-45412 disclose a resinous glass made of a copolymer of dibenzyl fumarate with diallyl phthalate, etc. and a resinous glass made of a copolymer of dibenzyl itaconate or dibenzyl mesaconate with diallyl phthalate, etc., respectively. In Japanese Patent Publn. No. Hei 1-60494, there is proposed resinous glass made of a copolymer of a pre-polycondensate of diallyl terephthalate (or isophthalate), methyl acrylate (or methacrylate) and an allyl (or alkyl) mono- or di-carboxylate. However, these resinous glasses involve a problem that they are deteriorated in impact-resistance.

In Japanese Laid-open Patent Appln. No. Sho. 59-140214, there is proposed resinous glass made of a polymer of diethyleneglycol bis-allylcarbonate oligomer. However, the resinous glass involves problems of a low refractive index and coloration of the resin.

In Japanese Laid-open Patent Appln. No. Hei 3-54213, there is also proposed resinous glass made of a copolymer of an oligomer of a diallyl terephthalate series and a monomer of vinyl series. However, this resinous glass is poor in impact-resistance.

Japanese Laid-open Patent Applns. Nos. Sho. 57-28115 and 60-55007 disclose a resinous glass made of a copolymer of a styrene derivative with a heavy metal salt of an unsaturated carboxylate and a resinous glass made of a copolymer of a diallyl phthalate which is nucleus-substituted with a halogen atom or atoms and an allyl benzoate which is nucleus-substituted with a halogen atom or atoms, respectively. These resinous glasses in fact have high refractive indices of 1.58–1.60 but instead lose a merit of lightweight because they contain a large amount of a heavy metal ion and halogen atoms and thus have a heavy specific gravity.

In Japanese Laid-open Patent Appln. No. Sho. 55-13747, there is proposed a resinous glass made of a copolymer of an acrylic or methacrylic monomer containing Bis-phenol A, a monomer of styrene series and an aryl methacrylate monomer, etc. However, this resinous glass involves a problem that it incurs coloration of the resultant lens and is poor in impact-resistance and adhesivity to a hard coating film.

In Japanese Laid-open Patent Appln. No. Sho. 59-133211, there is proposed a resinous glass of a copolymer of a hydroxy diacrylate or dimethacrylate containing an aromatic ring, a monomer of diisocyanate and a monomer of styrene series. However, an apparent merit of this resinous glass residing in a high refractive index of around 1.60 is compensated with an incidental demerit of low weather-resistance and a high specific gravity. Furthermore, in Japanese Laid-open Patent Appln. No. Hei. 3-70715, there is proposed a resinous glass with excellent transparency and a high refractive index obtained by thermocuring a composition comprised of a methacrylic ester, a polyfunctional methacrylate and a diacrylic diester and incorporated with a peroxy ester as a curing agent. However, this resinous glass has such a drawback that it is poor in adhesivity to a hard coating film and has an impermissibly great specific gravity.

Under the above circumstances, there is a great demand in the field of synthetic resins for use in optical elements to develop a new type resin which is excellent in various physicochemical properties such as transparency, mechanical strength, solvent-resistance and weather-resistance, and thus overcomes all the drawbacks as seen in the conventional resins.

SUMMARY OF THE INVENTION

Accordingly, it is an object of the present invention to provide a new type cast resin suitable for optical use excellent in transparency and refractive index as well as having high mechanical strength, solvent-resistance and weatherability.

Other and further objects, features and advantages of the present invention will become apparent more fully from the following description.

According to the present invention, there is provided a cast resin for optical use obtained by polymerizing 40–90% by weight of a polymerizable component 1 of a diallylphthalate component represented by the formula:

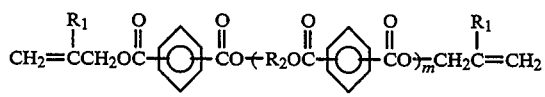

wherein —$R_1$ stands for a hydrogen atom or a methyl group, —$OR_2$ for a dihydric alcohol residue having 1–5 carbon atoms, and m for an integer of 0–20, with 10–60% by weight of a polymerizable component 2 of an alkyleneglycol bis-allylcarbonate component represented by the formula:

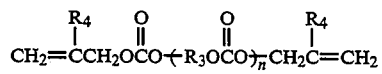

wherein —$R_4$ stands for a hydrogen atom or a methyl group, —$OR_3$ for a dihydric alcohol residue having 1–10 carbon atoms, and n for an integer of 1–10.

According to the present invention, there is provided a cast resin for optical use obtained by polymerizing 40–89% by weight of a polymerizable component 1 of a diallylphthalate component represented by the formula:

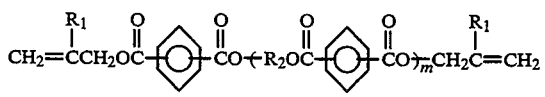

wherein —$R_1$ stands for a hydrogen atom or a methyl group, —$OR_2$ for a dihydric alcohol residue having 1–5 carbon atoms, and m for an integer of 0–20, with 10–59% by weight of a polymerizable component 2 of an alkyleneglycol bis-allylcarbonate component represented by the formula:

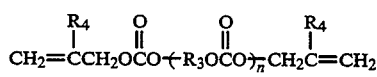

wherein —$R_4$ stands for a hydrogen atom or a methyl group, —$OR_3$ for a dihydric alcohol residue having 1–10 carbon atoms, and n for an integer of 1–10 and a polymerizable component 3 of a vinyl compound represented by the formula:

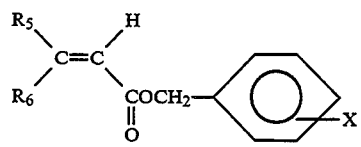

wherein one of $R_5$ and $R_6$ stands for a hydrogen atom and the other for a grouping:

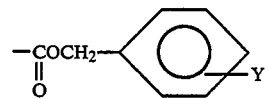

and X and Y are the same or different and stand for a hydrogen atom or a halogen atom other than a fluorine atom.

DETAILED DESCRIPTION OF THE INVENTION

In accordance with the present invention, the polymerizable component 1 of diallylphthalate component represented by the formula:

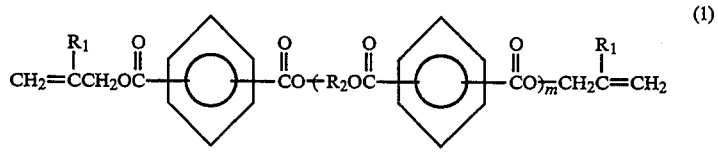

wherein —$R_1$ stands for a hydrogen atom or a methyl group, —$OR_2$ for a dihydric alcohol residue having 1–5 carbon atoms, and m for an integer of 0–20, is polymerized or copolymerized with the polymerizable component 2 of alkyleneglycol bis-allylcarbonate represented by the formula:

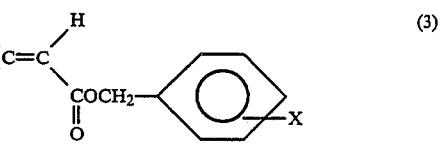

wherein $R_4$ stands for a hydrogen atom or a methyl group, —$OR_3$ for a dihydric alcohol residue having 1–10 carbon atoms, and n for an integer of 1–10.

In accordance with the present invention, the polymerizable component 3 of vinyl compound represented by the formula:

$$\begin{array}{c} R_5 \\ \diagdown \\ R_6 \end{array} C=C \begin{array}{c} H \\ \diagup \\ COCH_2 \end{array} \!\!\!\!\!\!\!\!\!\!\!\!\!\!\!\!\!\!\!\!\!\! - \!\!\bigcirc \!\!- X \quad (3)$$

wherein one of $R_5$ and $R_6$ stands for a hydrogen atom and the other for a grouping:

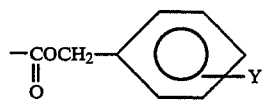

and X and Y are the same or different and stand for a hydrogen atom or a halogen atom other than a fluorine atom, may be polymerized or terpolymerized with the abovementioned components 1 and 2.

In the formula (1) of the polymerizable component 1, —$OR_2$ should be a dihydric alcohol residue having 1–5 carbon atoms. If the number of carbon atoms exceeds 5, the heat-resistance and the refractive index of he resultant polymer will be deteriorated. As to the degree of polycondensation of the polymerizable component 1 wherein m is an integer of 0–20, no limitation exists in polycondensation so far as the number of m is an integer of 0-20. Since exact control of the molecular weight is difficult in case of preparing the above polymerizable component 1 by transesterification, a mixture of the component 1 each having a definite distribution of the moleculer weight can conveniently be used in the present invention unless the number of m exceeds 20. In order to remarkably improve the impact-strength, refractive index and viscosity of a resin to be co- or ter-polymerized, the distribution of the molecular weights may preferably be as follows:

20-70% by weight of m=0, 20-40% by weight of m=1, 1-20% by weight of m=2, 0-20% by weight of m=3, 0-15% by weight of m=4, 0-10% by weight of m=5, and 0-10% by weight of $6 \leq m \leq 20$. If the value of m in case of zero is lower than 20% by weight, the viscosity is remarkably increased, thus not being preferred, whereas in excess of 70% by weight, the impact-resistance of a resin to be copolymerized or terpolymerized will be deteriorated. On the other hand, if the value of m in case of at least 6 but not greater than 20 exceeds 10% by weight, the viscosity of a resin to be copolymerized or terpolymerized will become extremely high.

In preparation of the polymerizable component 1, for example diallyl phthalate is subjected to transesterification with dihydric alcohol in the presence of a catalyst preferably at 50°-200° C. for 2-12 hours. In order to set the distribution of m in the range as mentioned above, the amounts of the feed materials, temperatures, time periods and pressure are appropriately set to thereby readily prepare the polymerizable component 1. The examples of diallyl phthalate include diallyl phthalate, diallyl isophthalate and diallyl terephthalate. On the other hand, the examples of dihydric alcohol include ethylene glycol, propylene glycol, 1,3-propanediol, 1,4-butanediol, 1,3-butanediol and neopentyl glycol. Illustrative of the above catalyst for the transesterification reaction are, for example, an alkaline catalyst such as potassium hydroxide, sodium hydroxide, and a sodium lower alkoxide, a calcium compound such as calcium hydroxide, a magnesium compound such as magnesium chloride, a zinc compound, such as dimethyl zinc or zinc chloride, a cadmium compound such as cadmium chloride, a titanium compound such as titanium tetrachloride, a germanium compound such as germanium oxide, a tin compound such as dibutyl tin oxide or stannic chloride, a lead compound such as lead acetate, a manganese compound such as maganese dioxide, and antimony compound such as antimony trichloride.

When reacting diallyl isophthalate with ethylene glycol, the above transesterification reaction can be exemplified according to the following reaction formulas:

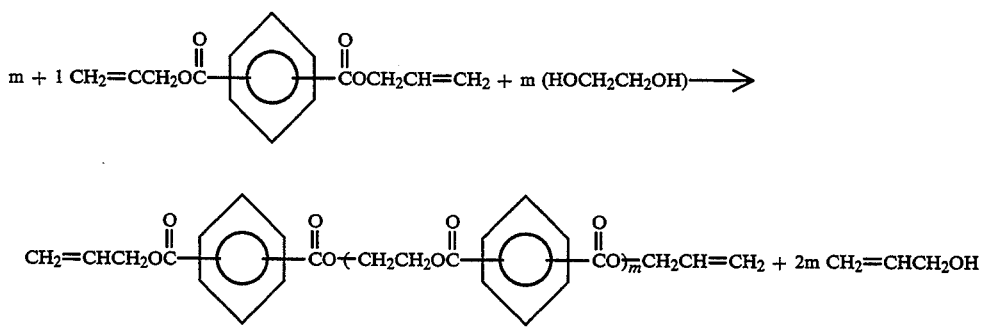

wherein m stands for an integer of 1-20.

In the formula (2) of the polymerizable component 2, $-OR_3$ should be a dihydric alcohol residue having 1-10 carbon atoms. If the carbon atoms exceed 10, the heat resistance of the resultant resin will become inferior. As to the degree of polycondensation of the polymerizable component 2 of the formula (2) wherein n is an integer of 1-10, no limitation exists in polycondensation so far as the number of n is an integer of 1-10. Since exact control of the molecular weight is difficult in case of preparing the above polymerizable component 2 by transesterification, a mixture of the component 2 each having a definite distribution of the molecular weight can conveniently be used in the present invention, just like the case of the polymerizable component 1, unless the number of n exceeds 10. In order to remarkably improve the impact-strength, refractive index and viscosity, the distribution of the molecular weights is preferably as follows:

20-60% by weight of n=1, 25-40% by weight of n=2, 5-25% by weight of n=3, 1-20% by weight of n=4, and 0-15% by weight of $5 \leq n \leq 10$.

In preparation of the polymerizable component 2, for example diallycarbonate is subjected to transesterification with dihydric alcohol in the presence of a catalyst preferably at 50°-200° C. for 2-12 hours. In order to set the distribution of n in the range as mentioned above, the amounts of the feed materials, temperatures, time periods and pressure are appropriately set to therby readily prepane the polymerizable component 2. The examples of the dihydric alcohol include ethylene glycol, propylene glycol, 1,3-propanediol, 1,4-butanediol, 1,3-butanediol, neopentyl glycol, diethylene glycol and dipropylene glycol. The same catalyst as mentioned above in terms of the polymerizable component 1 may be used.

As mentioned above, the polymerizable component 3 may be polymerized or terpolymeried with the components 1 and 2. Illustrative of the polymerizable component 3 are, for example, fumarate compounds such as dibenzyl fumarate, bis-(2-chlorobenzyl)fumarate, bis(4-chlorobenzyl)fumarate, bis-(4-bromobenzyl)fumarate and bis(2-bromobenzyl)fumarate; and maleate compounds such as dibenzyl maleate, bis(2-chlorobenzyl)-maleate, bis(4-chlorobenzyl)maleate, bis(4-bromobenzyl)maleate and bis(2-bromobenzyl)maleate.

In accordance with the invention, the polymerizable component 1 is copolymerized with a given proportion of the polymerizable component 2. The proportion of the polymerizable component 1 is limited to a range of 40-90% by weight based on the total polymerizable components. If the proportion of the polymerizable component 1 is less than 40% by weight, the resultant resin will become inferior in refractive index. If the proportion exceeds 90% by weight, the resultant resin will become poor in impact-strength and color hue. On the other hand, the proportion of the polymerizable component 2 is also limited to a range of 10–60% by weight of the total polymerizable components. If the proportion of the polymerizable component is less than 10% by weight, the resultant resin will become inferior in impact-strength, color hue and adhesivity to a hard coat. In contrast, if the proportion exceeds 60% by weight, the resultant resin will be increased in refractive index.

In accordance with the invention, the polymerizable component 1 may be terpolymerized with given proportions of the polymerizable components 2 and 3. The proportion of the polymerizable component 1 has to be limited to a range of 40–89% by weight based on the total polymerizable components. If the proportion of the polymerizable component 1 is less than 40% by weight, the resultant resin will be reduced in refractive index. In contrast, if the proportion exceeds 89% by weight, the resultant resin will be inferior in impact-strength and color hue. On the other hand, the proportion of the polymerizable component 2 is limited to a range of 10–59% by weight based on the total polymerizable components. If the proportion of the polymerizable component 2 is less than 10% by weight, the resultant resin will become inferior in impact-resistance, color hue and adhesivity to a hard coat. On the contrary, if the proportion exceeds 59% by weight, the resultant resin will be reduced in refractive index. The amount of the polymerizable component 3 is to be limited to a range of 1–30% by weight, preferably 3–20% by weight in respect of color hue, impact-strength and heat-resistance. If the proportion of the polymerizable component 3 is less than 1% by weight, the resultant resin will become inferior in color hue and impact-strength. In contrast, if the proportion exceeds 30% by weighth, the resultant resin will become inferior in heat-resistance.

The above polymerizable components 1 and 2 may optionally be used conjointly with a vinyl monomer not represented by the formulas (1), (2) and (3). Illustrative of such vinyl monomer are, for example, aromatic vinyl compounds such as styrene, p-methylstyrene, p-chlorostyrene, α-methylstyrene, vinylnaphthalene and divinylbenzene; vinyl esters such as vinyl acetate, vinyl benzoate, allyl benzoate and divinyl phthalate; acrylic or methacrylic monomers such as acrylic and methacrylic acids, glycidyl acrylate and methacrylate, methyl acrylate and methacrylate, ethyl acrylate and methacrylate, isopropyl acrylate and methacrylate, n-propyl acrylate and methacrylate, isobutyl acrylate and methacrylate, sec-butyl acrylate and methacrylate, n-butyl acrylate and methacrylate, allyl acrylate and methacrylate, methallyl acrylate and methacrylate, vinyl acrylate and methacrylate, 2-hydroxyethyl acrylate and methacrylate, 2-hydroxypropyl acrylate and methacrylate, cyclohexyl acrylate and methacrylate, phenyl acrylate and methacrylate, benzyl acrylate and methacrylate, naphthyl methacrylate, ethyleneglycol diacrylate and dimethacrylate, diethyleneglycol diacrylate and dimethacrylate, triethyleneglycol acrylate and methacrylate, 2-hydroxy-3-phenoxypropyl acrylate and methacrylate, 3-acryloyloxyglycerol monomethacrylate, 2,2-bis-(acryloyloxy-ethoxyphenyl)propane, 2,2-bis-(methacryloyloxy-ethoxyphenyl) propane, 2,2-bis-(acryloyloxy-diethoxyphenyl)propane, 2,2-bis-(methacryloyloxy-diethoxyphenyl)propane, 2,2-bis-[acryloyloxy(2'-hydroxypropyloxy)phenyl]propane, 2,2-bis-[methacryloyloxy(2'-hydroxypropyloxy)-phenyl]propane, 2-acryloyloxyethyl succinic acid and 2-methacryloyloxyethylsuccinic acid; and other unsaturated acids and esters thereof such as diisopropyl fumarate, dicyclohexyl fumarate, dibenzyl maleate, dibenzyl itaconate, dibenzyl mesaconate, maleic anhydride and itaconic anhydride. These vinyl monomers can be used singly or as a mixture. the amount of this vinyl monomer is preferably less than 10% by weight based on the total of the polymerizable components and monomers.

According to the present invention, the polymerization of these polymerizable components and optionally the vinyl monomer can be carried out simultaneously. That is, a mixture of the polymerizable components 1 and 2 or 1, 2 and 3 with one or more of the vinyl monomers is incorporated with a curing agent to prepare a polymerizable composition.

The curing agent utilizable in this case may preferably be an organic peroxide having a temperature of not more than 120° C. in a selected half life period of 10 hours. Preferable examples of such organic peroxide include, for example, peracids, perhydroxy compounds and peroxy ethers as well as azo-bis-nitriles. These compounds are conventionally known and commerically available. Illustrative of the typical curing agent are, for example, lauroyl peroxide, benzoyl peroxide, diisopropylperoxy dicarbonate, di-n-propylperoxy dicarbonate, bis(4-t-butylcyclohexyl)peroxy dicarbonate, t-butylperoxy isopropyl carbonate, t-butylperoxy benzoate, 1,1-bis(t-butylperoxy)-3,3,5-trimethylcyclohexane, azo-bis-isobutyronitrile and mixtures of these.

The curing agent is used in an amount of 0.05–5% by weight, preferably 0.1–4% by weight based on the total amount of the polymerizable components and optionally the vinyl monomers. If the amount of the curing agent is less than 0.05% by weight, the amount will be insufficient for polymerization so that the resultant resin will be inferior in various physical properties. In contrast, if the amount exceeds 5% by weight, control of the polymerization reaction will become difficult so that the resultant resin will tend to form cracks on the surface thereof.

The polymerizable composition is placed in a mold of a predetermined shape and, after preferably replacing the air in the mold with an inert gas such as nitrogen, helium, and carbon dioxide subjected to polymerization preferably under heating.

In some cases, it is preferable that the polymerizable composition is preliminarily heated desirably at 30°–70° C. in a suitable vessel for prepolymerization to form a prepolymer which is then charged into the mold. The temperature for effecting polymerization of the composition varies according to the sort of the curing agent used, but it is generally within the range of 20°–130° C. Further, the polymerization of the composition is slowly carried out preferably at a temperature by 20° C. lower than the temperature in a half life period of 10 hours of the curing agent used. The temperature may be elevated properly for shortening the curing time or for treating any unreacted monomer. The polymerization time at a temperature above recommended is preferably within a period of 5–48 hours.

The cast resin thus obtained can directly be used for an optical article aimed at. Since the resin obtainable by the above heat polymerization involves internal strain due to heat, the resin may preferably be annealed at a temperature of 110°–140° C., desirably 110°–130° C. for a period from at least 30 minutes to 6 hours, desirably for a period of 1–4 hours.

Upon the manufacture of the cast resin for use in optical elements, the polymerizable composition or a viscous prepolymer thereof may be incorporated, if desired, with one or more of the various additives for enhancing the utility of the optical elements. Examples of such additives include coloring substances such as dyes and pigments, various protecting agents such as UV-absorbing agents, various stabilizers such as antioxidants, antistatic agents, photochromic agents, optical brightening agents, mold-releasing agents, and the like. These substances are well known and can be used in combination in an amount adequate for the desired purpose.

Furthermore, the cast resin may be provided on the outer surface thereof with a hard coat film to enhance the anti-abrasive properties of the surface. Moreover, a primer layer may be interposed between the surface of the resin and the hard coat film to improve adhesivity of the resin to the hard coat film. In order to apply a hard coating agent onto the outer surface of the resin to provide the surface with a hard coat film, the resin completely hardened and annealed is firstly coated with a primer solution and then with a hard coating agent according to a known conventional method, for example, by way of dipping, spin-coating, flow-coating, spraying and the like method. It is also possible to provide the surface of the cast resin with a reflection-preventing film to inhibit the surface reflection on the surface of the optical elements thereby increasing the transmission rate of visible light.

The cast resin for use in optical elements thus obtained has a refractive index as high as 1.53 or more, preferably 1.53~1.59 and an Abbe's number of at least 30, preferably 30~45 and is colorless and transparent, and moreover excellent in impact-strength, heat-resistance and adhesivity to a hard coat film. The cast resin of the present invention is thus useful in the fields of lens industries for manufacturing, for example, eye glasses, optical elements for various industries, and resinous plates of a high refractive index for various industries.

EXAMPLES OF THE INVENTION

The present invention will now be illustrated more in detail by way of examples and comparative examples.

EXAMPLE I-1

A polymerizable composition was obtained by mixing 7 g of a polymerizable component represented by the following formula (A), with 3 g of a polymerizable component represented by the following formula (B), and 0.2 g of diisopropyl peroxydicarbonate. The resultant composition was charged into a mold composed of 2 plates of glass (using an ethylene acrylate gasket), polymerized at a curing temperature of 40° C. for 12 hours in a thermostatic oven maintained at 40° C., then elevated the temperature up to 80° C. over 6 hours and thermally polymeried at 80° C. for 2 hours whereby copolymerization of the two copolymerizable components was effected. After completion of the copolymerization, the cured resin was released from the mold and it was subjected to an annealing treatment conducated at 120° C. for 2 hours.

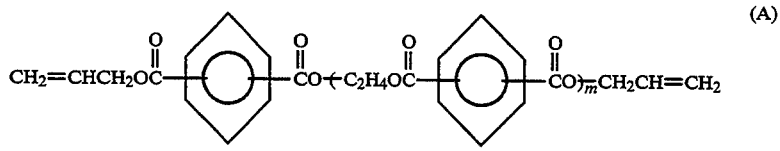
(A)

(Distribution of m: m=0 ... 64% by weight, m=1 ... 31% by weight, m=2 ... 4% by weight, and m=3 ... 1% by weight).

(B)

(Distribution of n: n=1 ... 52% by weight, n=2 ... 36% by weight, n=3 ... 9% by weight, and n=4 ... 3% by weight).

The resultant cured resin was then subjected to a surface treatment using a 5% by weight solution of caustic soda, and a coating liquid comprised predominantly of γ-glycidooxypropyltrimethoxysilane was applied onto the resin according to a dipping method. After application of the coating liquid, the coated resin was heated at 110° C. for 90 minutes in a dryer for drying.

The cured resin further provided with a hard coating film was coated on the surface thereof with $SiO_2$, $ZrO_2$, $Al_2O_3$ and $SiO_2$ films in the written order by way of vapor deposition in argon plasma under pressure of $10^{-5}$ Torr to prepare a resin with a reflection-preventing film. The resultant resin was then tested for evaluation of various physical properties, a result of the test being shown in Table 3 below. By the way, the following testing methods were carried out for evaluation of the various properties.

Refractive index (Abbe's number): measured according to an Abbe's refractometer.

Impact-resistance: A 68 g steel ball was dropped from a height of 127 cm to the cured resin plate of 1.8 mm in thickness whereupon the plate not broken is arbitrarily marked as o while the broken one is marked as x.

Heat-resistance: A sample of the resin was allowed to stand in a dryer kept at 130° C. for 2 hours whereupon the sample not showing any change such as deformation, crack and coloration is marked as o while the sample undergoing such change is marked as x.

Specific gravity: calculated from the ratio of the weight of the resin to the volume of the resin according to the water-substitution method.

Solvent-resistance: A sample of the resin was allowed to stand in acetone for 2 hours whereupon the sample not showing any change such as deformation, crack and coloration of the resin is marked as o while the sample undergoing such change is marked as x.

Adhesivity of the hard coating film: After a sample of the resin had been immersed in warm water of 80° C. for 48 hours, the surface of the resin (lens) was cross-cut to form 100 squares thereon and the adhesion-peeling test was repeated for 5 times using "Cellulose Tape" (Nichiban, Japan) whereby the number of squares not peeled off was counted.

EXAMPLES I-2-I-15

The polymerization and the formation of a hard coat film and a reflection-preventing film were carried out in the same manner as illustrated in Example I-1 except that diallyphthalate components shown in Table 1 and alkyleneglycol bisallylcarbonate components shown in Table 2 were used to prepare polymerizable compositions shown in Table 3. Various physical properties of the resultant resins were evaluated as described in Example I-1, a result of which is shown in Table 3 below.

EXAMPLE II-1

A polymerizable composition was obtained by mixing 6 g of a polymerizable component represented by the following formula (C) and 3 g of a polymerizable component represented by the following formula (D) with 1 g of dibenzyl fumarate as the vinyl compound and 0.2 g of diisopropyl peroxydicarbonate as a polymerization catalyst. The resultant polymerizable composition was subjected to polymerization and worked up in the same manner as illustrated in Example I-1.

The resultant cast cured resin was then tested for evaluation of various physical properties. The testing methods adopted were the same as in Example I-1. A result of the test is shown in Table 4.

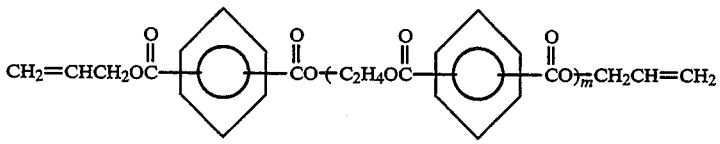

(Distribution of m: m=0 ... 64% by weight, m=1 ... 31% by weight, m=2 ... 4% by weight, and m=3 ... 1% by weight).

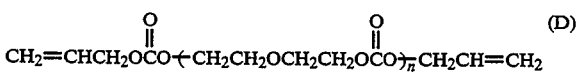

(D)

(Distribution of n: n=1 ... 52% by weight, n=2 ... 36% by weight, n=3 ... 9% by weight, and n=4 ... 3% by weight).

EXAMPLES II-2-II-15

The polymerization and the formation of a hard coat film and a reflection-preventing film were carried out in the same manner as illustrated in Example I-1 except that polymerizable compositions as shown in Table 4 were used. Various physical properties of the resultant resins were evaluated as described in Example I-1, a result of which is shown in Table 4 below.

COMPARATIVE EXAMPLES 1-11

The resins were prepared in the same manner as illustrated in Example I-1 except that the polymerizable components as shown in Table 5 below were used. Various physical properties of the resins were evaluated as described in Example I-1, a result of which is shown in Table 5.

The abbreviations used in the Tables 3-5 mean the following structural formula, the following compounds and the abbreviations of the compounds listed in Tables 1 and 2:

DBzF: Dibenzyl fumarate
DBzM: Dibenzyl maleate
BCBF: Bis-(2-chlorobenzyl) fumarate
BCBM: Bis-(2-chlorobenzyl) maleate
BBBM: Bis-(4-bromobenzyl) maleate
MMA: Methyl methacrylate
ADC: Diethyleneglycol bisallylcarbonate
DAIP: Diallyl isophthalate
BMEPP: The compound represented by the following chemical formula:

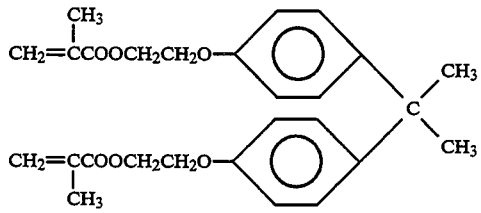

(C)

BzMA: Benzyl methacrylate
BPO: Benzoyl peroxide
IPP: Diisopropyl peroxydicarbonate
NPP: Di-n-propyl peroxydicarbonate
TCP: Bis(4-t-butylcyclohexyl) peroxydicarbonate
TPB: t-Butylperoxy benzoate
TPI: t-Butylperoxy isopropyl carbonate.
DATP: diallyl terephthalate
P (placed before a chemical abbreviation): poly- (i.e., PDAIP=poly diallyl isophthalate)
VL—very low viscosity
M—medium viscosity
H—high viscosity The preceding three abbreviations denote the viscosity of the oligomers used. In the tables, these letters are found in combination with numbers, i.e., 2VL, 2H, 2M, 3VL, etc. These numbers represent the number of carbon atoms in the $R_2$ and $R_3$ position in the formula, provided that when the numbers concern the $R_3$ position in the formula, it denotes half the number of carbon atoms found at position $R_3$.

TABLE 1

| Abbreviation | $R_2$ | m | Proportion (wt. %) |
|---|---|---|---|

$$CH_2=CHCH_2OC-\bigcirc-CO(R_2OC-\bigcirc-CO)_mCH_2CH=CH_2$$

TABLE 1-continued

| Abbreviation | R$_2$ | m | Proportion (wt. %) |
|---|---|---|---|
| PDAIP-2VL | C$_2$H$_4$ | 0 | 64 |
| | | 1 | 31 |
| | | 2 | 4 |
| | | 3 | 1 |
| PDAIP-3VL | CH$_3$<br>\|<br>CHCH$_2$ | 0 | 61 |
| | | 1 | 32 |
| | | 2 | 5 |
| | | 3 | 2 |
| PDAIP-4VL | C$_4$H$_8$ | 0 | 59 |
| | | 1 | 29 |
| | | 2 | 8 |
| | | 3 | 4 |
| PDAIP-2L | C$_2$H$_4$ | 0 | 48 |
| | | 1 | 28 |
| | | 2 | 15 |
| | | 3 | 6 |
| | | 4 | 3 |
| PDAIP-3L | CH$_3$<br>\|<br>CHCH$_2$ | 0 | 45 |
| | | 1 | 27 |
| | | 2 | 16 |
| | | 3 | 8 |
| | | 4 | 3 |
| | | 5 | 1 |
| PDAIP-2M | C$_2$H$_4$ | 0 | 34 |
| | | 1 | 25 |
| | | 2 | 16 |
| | | 3 | 10 |
| | | 4 | 6 |
| | | 5~10 | 9 |
| PDAIP-3M | CH$_3$<br>\|<br>CHCH$_2$ | 0 | 35 |
| | | 1 | 26 |
| | | 2 | 17 |
| | | 3 | 11 |
| | | 4 | 5 |
| | | 5~10 | 6 |
| PDAIP-2H | C$_2$H$_4$ | 0 | 20 |
| | | 1 | 22 |
| | | 2 | 16 |
| | | 3 | 16 |
| | | 4 | 10 |
| | | 5 | 6 |
| | | 6~20 | 10 |

$$CH_2=CHCH_2O\overset{O}{\underset{\|}{C}}-\underset{\bigcirc}{\phantom{X}}-\overset{O}{\underset{\|}{C}}O(R_2O\overset{O}{\underset{\|}{C}}-\underset{\bigcirc}{\phantom{X}}-\overset{O}{\underset{\|}{C}}O)_mCH_2CH=CH_2$$

| Abbreviation | R$_2$ | m | Proportion (wt. %) |
|---|---|---|---|
| PDATP-2VL | C$_2$H$_4$ | 0 | 64 |
| | | 1 | 31 |
| | | 2 | 4 |
| | | 3 | 1 |
| PDATP-3VL | CH$_3$<br>\|<br>CHCH$_2$ | 0 | 61 |
| | | 1 | 32 |
| | | 2 | 5 |
| | | 3 | 2 |
| PDATP-3L | CH$_3$<br>\|<br>CHCH$_2$ | 0 | 45 |
| | | 1 | 27 |
| | | 2 | 16 |
| | | 3 | 8 |
| | | 4 | 3 |
| | | 5 | 1 |
| PDATP-2M | C$_2$H$_4$ | 0 | 34 |
| | | 1 | 25 |
| | | 2 | 16 |
| | | 3 | 10 |
| | | 4 | 6 |
| | | 5~10 | 9 |

TABLE 1-continued

| Abbreviation | $R_2$ | m | Proportion (wt. %) |
|---|---|---|---|
| PDATP-3M | CH$_3$<br>\|<br>CHCH$_2$ | 0<br>1<br>2<br>3<br>4<br>5~10 | 35<br>26<br>17<br>11<br>5<br>6 |

TABLE 2

| Abbreviation | $R_3$ | n | Proportion (wt. %) |
|---|---|---|---|
| PADC-2L | C$_2$H$_4$OC$_2$H$_4$ | 1<br>2<br>3<br>4 | 52<br>36<br>9<br>3 |
| PADC-3L | CH$_3$   CH$_3$<br>\|          \|<br>CHCH$_2$OCHCH$_2$ | 1<br>2<br>3<br>4 | 50<br>37<br>10<br>3 |
| PADC-2M | C$_2$H$_4$OC$_2$H$_4$ | 1 | 34 |

TABLE 2-continued

| Abbreviation | $R_3$ | n | Proportion (wt. %) |
|---|---|---|---|
|  |  | 2<br>3<br>4<br>5~8 | 33<br>17<br>10<br>6 |
| PADC-2H | C$_2$H$_4$OC$_2$H$_4$ | 1<br>2<br>3<br>4<br>5<br>6~10 | 21<br>30<br>20<br>15<br>8<br>6 |

TABLE 3

| Ex. | Polymerizable Comp. | (g) | Curing Agent | (g) | Curing Temp (°C.) | Refractive index | Abbe's number | Impact-strength | Heat-resistance | S.G. | Solvent-resistance | Adhesivity to hard coat film |
|---|---|---|---|---|---|---|---|---|---|---|---|---|
| I-1 | PDAIP-2VL<br>PADC-2H | (7)<br>(3) | IPP | (0.2) | 40 | 1.551 | 38 | ○ | ○ | 1.272 | ○ | 100 |
| I-2 | PDAIP-3VL<br>PADC-2H | (8)<br>(2) | IPP | (0.2) | 40 | 1.556 | 37 | ○ | ○ | 1.262 | ○ | 100 |
| I-3 | PDAIP-4VL<br>PADC-2M | (4)<br>(6) | NPP | (0.2) | 40 | 1.532 | 41 | ○ | ○ | 1.297 | ○ | 100 |
| I-4 | PDAIP-2L<br>PADC-2H | (9)<br>(1) | NPP | (0.2) | 40 | 1.562 | 36 | ○ | ○ | 1.257 | ○ | 100 |
| I-5 | PDAIP-3L<br>PADC-2M | (5)<br>(5) | BPO | (0.1) | 70 | 1.538 | 40 | ○ | ○ | 1.289 | ○ | 100 |
| I-6 | PDAIP-2M<br>PADC-2M | (4)<br>(6) | BPO | (0.1) | 70 | 1.531 | 41 | ○ | ○ | 1.295 | ○ | 100 |
| I-7 | PDAIP-3M<br>PADC-3L | (7)<br>(3) | TCP | (0.3) | 40 | 1.546 | 39 | ○ | ○ | 1.269 | ○ | 100 |
| I-8 | PDAIP-2H<br>PADC-2L | (9)<br>(1) | TCP | (0.3) | 40 | 1.557 | 37 | ○ | ○ | 1.255 | ○ | 100 |
| I-9 | PDATP-2VL<br>PADC-2H | (6)<br>(4) | TPB | (0.3) | 100 | 1.547 | 39 | ○ | ○ | 1.281 | ○ | 100 |
| I-10 | PDATP-3VL<br>PADC-2H | (7)<br>(3) | TPB | (0.3) | 100 | 1.551 | 38 | ○ | ○ | 1.270 | ○ | 100 |
| I-11 | PDATP-3L<br>PADC-2M | (5)<br>(5) | TPI | (0.3) | 100 | 1.538 | 40 | ○ | ○ | 1.287 | ○ | 100 |
| I-12 | PDATP-2M<br>PADC-3L | (4)<br>(6) | TPI | (0.3) | 100 | 1.531 | 41 | ○ | ○ | 1.294 | ○ | 100 |
| I-13 | PDATP-3M<br>PADC-2L | (5)<br>(5) | IPP | (0.2) | 40 | 1.537 | 40 | ○ | ○ | 1.286 | ○ | 100 |
| I-14 | PDAIP-3VL<br>PADC-2L<br>BzMA | (7)<br>(2.5)<br>(0.5) | NPP | (0.2) | 40 | 1.553 | 38 | ○ | ○ | 1.266 | ○ | 100 |
| I-15 | PDAIP-2M<br>PADC-2L<br>BMEPP | (5.0)<br>(4.0)<br>(1.0) | TCP | (0.3) | 40 | 1.545 | 39 | ○ | ○ | 1.285 | ○ | 100 |

TABLE 4

| Ex. | Polymerizable Comp. | (g) | Curing Agent | (g) | Curing Temp (°C.) | Refractive index | Abbe's number | Impact-strength | Heat-resistance | S.G. | Solvent-resistance | Adhesivity to hard coat film |
|---|---|---|---|---|---|---|---|---|---|---|---|---|
| II-1 | PDAIP-2VL<br>PADC-2H<br>DBzF | (6)<br>(3)<br>(1) | IPP | (0.2) | 40 | 1.552 | 38 | ○ | ○ | 1.271 | ○ | 100 |
| II-2 | PDAIP-3VL<br>PADC-2H<br>DBzM | (7)<br>(2)<br>(1) | NPP | (0.2) | 40 | 1.557 | 37 | ○ | ○ | 1.265 | ○ | 100 |
| II-3 | PDAIP-4VL<br>PADC-2M | (4)<br>(4) | TPB | (0.3) | 100 | 1.552 | 36 | ○ | ○ | 1.300 | ○ | 100 |

TABLE 4-continued

| Ex. | Polymerizable Comp. | (g) | Curing Agent | (g) | Curing Temp (°C.) | Refractive index | Abbe's number | Impact-strength | Heat-resistance | S.G. | Solvent-resistance | Adhesivity to hard coat film |
|---|---|---|---|---|---|---|---|---|---|---|---|---|
| | BCBF | (2) | | | | | | | | | | |
| II-4 | PDAIP-2L | (6) | TPI | (0.3) | 100 | 1.574 | 33 | ○ | ○ | 1.262 | ○ | 100 |
| | PADC-2H | (1) | | | | | | | | | | |
| | BCBM | (3) | | | | | | | | | | |
| II-5 | PDAIP-3L | (5) | BPO | (0.1) | 70 | 1.544 | 36 | ○ | ○ | 1.291 | ○ | 100 |
| | PADC-2M | (4.5) | | | | | | | | | | |
| | BBBM | (0.5) | | | | | | | | | | |
| II-6 | PDAIP-2M | (4) | BPO | (0.1) | 70 | 1.540 | 39 | ○ | ○ | 1.294 | ○ | 100 |
| | PADC-2M | (5) | | | | | | | | | | |
| | DBzF | (1) | | | | | | | | | | |
| II-7 | PDAIP-3M | (5) | IPP | (0.2) | 40 | 1.551 | 38 | ○ | ○ | 1.267 | ○ | 100 |
| | PADC-3L | (3) | | | | | | | | | | |
| | DBzF | (2) | | | | | | | | | | |
| II-8 | PDAIP-2H | (8.5) | IPP | (0.2) | 40 | 1.558 | 37 | ○ | ○ | 1.255 | ○ | 100 |
| | PADC-2L | (1) | | | | | | | | | | |
| | DBzF | (0.5) | | | | | | | | | | |
| II-9 | PDATP-2VL | (5) | TCP | (0.3) | 40 | 1.549 | 39 | ○ | ○ | 1.280 | ○ | 100 |
| | PADC-2H | (4) | | | | | | | | | | |
| | DBzM | (1) | | | | | | | | | | |
| II-10 | PDATP-3VL | (5.5) | TPB | (0.3) | 100 | 1554 | 38 | ○ | ○ | 1.268 | ○ | 100 |
| | PADC-2H | (3) | | | | | | | | | | |
| | DBzM | (1.5) | | | | | | | | | | |
| II-11 | PDATP-3L | (6) | NPP | (0.2) | 40 | 1.568 | 35 | ○ | ○ | 1.287 | ○ | 100 |
| | PADC-2M | (1) | | | | | | | | | | |
| | DBzM | (3) | | | | | | | | | | |
| II-12 | PDATP-2M | (4) | TPI | (0.3) | 100 | 1.533 | 41 | ○ | ○ | 1.294 | ○ | 100 |
| | PADC-3L | (5.5) | | | | | | | | | | |
| | DBzF | (0.25) | | | | | | | | | | |
| | DBzM | (0.25) | | | | | | | | | | |
| II-13 | PDATP-3M | (5) | IPP | (0.2) | 40 | 1.558 | 36 | ○ | ○ | 1.284 | ○ | 100 |
| | PADC-2L | (2.5) | | | | | | | | | | |
| | スチレン | (0.5) | | | | | | | | | | |
| | DBzF | (2) | | | | | | | | | | |
| II-14 | PDAIP-3VL | (6) | NPP | (0.2) | 40 | 1.555 | 37 | ○ | ○ | 1.265 | ○ | 100 |
| | PADC-2L | (2.5) | | | | | | | | | | |
| | BzMA | (0.5) | | | | | | | | | | |
| | DBzF | (1) | | | | | | | | | | |
| II-15 | PDAIP-2M | (5) | TCP | (0.3) | 40 | 1.553 | 37 | ○ | ○ | 1.284 | ○ | 100 |
| | PADC-2L | (3) | | | | | | | | | | |
| | BMEPP | (1) | | | | | | | | | | |
| | DBzM | (1) | | | | | | | | | | |

TABLE 5

| Ex. | Polymerizable Comp. | (g) | Curing Agent | (g) | Curing Temp (°C.) | Refractive index | Abbe's number | Impact-strength | Heat-resistance | S.G. | Solvent-resistance | Adhesivity to hard coat film |
|---|---|---|---|---|---|---|---|---|---|---|---|---|
| 1 | MMA | (10) | BPO | (0.1) | 70 | 1.492 | 58 | ○ | X | 1.191 | X | 24 |
| 2 | Styrene | (10) | BPO | (0.1) | 70 | 1.591 | 32 | ○ | X | 1.054 | X | 7 |
| 3 | ADC | (10) | IPP | (0.3) | 40 | 1.499 | 55 | X | ○ | 1.327 | ○ | 100 |
| 4 | DAIP | (7) | IPP | (0.3) | 40 | 1.561 | 37 | X | ○ | 1.276 | ○ | 100 |
| | ADC | (3) | | | | | | | | | | |
| 5 | Styrene | (5) | BPO | (0.1) | 70 | 1.582 | 33 | X | ○ | 1.170 | ○ | 14 |
| | BMEPP | (5) | | | | | | | | | | |
| 6 | PDAIP-2VL | (10) | IPP | (0.2) | 40 | 1.570 | 35 | X | ○ | 1.249 | ○ | 100 |
| 7 | PADC-2H | (10) | IPP | (0.2) | 40 | 1.508 | 50 | ○ | ○ | 1.329 | ○ | 100 |
| 8 | PDAIP-2L | (7) | IPP | (0.2) | 40 | 1.547 | 38 | X | ○ | 1.271 | ○ | 100 |
| | ADC | (3) | | | | | | | | | | |
| 9 | DAIP | (9) | NPP | (0.2) | 40 | 1.564 | 36 | X | ○ | 1.276 | ○ | 100 |
| | PADC-2H | (1) | | | | | | | | | | |
| 10 | PDAIP-2M | (9.5) | IPP | (0.2) | 40 | 1.561 | 36 | X | ○ | 1.256 | ○ | 91 |
| | PADC-2M | (0.5) | | | | | | | | | | |
| 11 | PDATP-2M | (3.5) | IPP | (0.2) | 40 | 1.527 | 42 | ○ | ○ | 1.297 | ○ | 100 |
| | PADC-2M | (6.5) | | | | | | | | | | |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A cast resin for optical use obtained by polymerizing 40–90% by weight of a polymerizable component 1 of a diallylphthalate component represented by the formula:

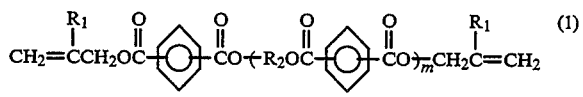

(1)

wherein —$R_1$ stands for a hydrogen atom or a methyl group, —$OR_2$ for a dihydric alcohol residue having 1–5 carbon atoms, and m for an integer of 0–20 wherein the fraction of said component 1 where m=0 ranges from 20–70% by weight, where m=1 ranges from 20–40% by weight, where m=2 ranges from 1–20% by weight, where m=3 ranges from 0–20% by weight, where m=4 ranges from 0–15% by weight, where m=5 ranges from 0–10% by weight, and where $6 \leq m \leq 20$ ranges from 0–10% by weight;

with 10–60% by weight of a polymerizable component 2 of an alkyleneglycol bis-allylcarbonate component represented by the formula:

(2)

wherein —$R_4$ stands for a hydrogen atom or a methyl group, —$OR_3$ for a dihydric alcohol residue having 1–10 carbon atoms and n for an integer of 1–10 wherein the fraction of said component 2 where n=1 ranges from 20–60% by weight, where n=2 ranges from 25–40% by weight, where n=3 ranges from 5–25% by weight, where n=4 ranges from 1–20% by weight, and where $5 \leq n \leq 10$ ranges from 0–15% by weight.

2. The cast resin defined in claim 1, wherein said polymerizable component 1 is prepared by transesterification reaction between a diallyl phthalate with a dihydric alcohol.

3. The cast resin defined in claim 2, wherein said diallyl phthalate is selected from the group consisting of diallyl phthalate, diallyl isophthalate, diallyl phthalate, and mixtures thereof.

4. The cast resin defined in claim 2, wherein said dihydric alcohol is selected from the group consisting of ethylene glycol, propylene glycol, 1,3-propane diol, 1,4-butane diol, 1,3-butane diol, neopentyl glycol and mixtures thereof.

5. The cast resin defined in claim 1, wherein said polymerizable component 2 is prepared by transesterification reaction between a diallyl carbonate and dihydric alcohol.

6. The cast resin defined in claim 5, wherein said dihydric alcohol is selected from the group consisting of ethylene glycol, propylene glycol, 1,3-propane diol, 1,4-butane diol, 1,3-butane diol, neopentyl glycol, diethylene glycol, dipropylene glycol and mixtures thereof.

7. The cast resin defined in claim 1 further comprising a vinyl monomer other than said polymerizable components 1 and 2 in an amount of not higher than 10% by weight basted on whole polymerizable components.

8. The cast resin defined in claim 1 wherein the refractive index and Abbe's number are 1.53 or higher and 30 or higher, respectively.

9. A cast resin for optical use obtained by polymerizing 40–89% by weight of a polymerizable component 1 of a diallylphthalate component represented by the formula:

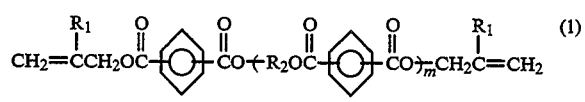

(1)

wherein —$R_1$ stands for a hydrogen atom or a methyl group, —$OR_2$ for a dihydric alcohol residue having 1–5 carbon atoms, and m for an integer of 0–20 wherein the fraction of said component 1 where m=0 ranges from 20–70% by weight, where m=1 ranges from 20–40% by weight, where m=2 ranges from 1–20% by weight, where m=3 ranges from 0–20% by weight, where m=4 ranges from 0–15% by weight, where m=5 ranges from 0–10% by weight, and where $6 \leq m \leq 20$ ranges from 0–10% by weight;

with 10–59% by weight of a polymerizable component 2 of an alkyleneglycol bis-allylcarbonate component represented by the formula:

(2)

wherein —$R_4$ stands for a hydrogen atom or a methyl group, —$OR_3$ for a dihydric alcohol residue having 1–10 carbon atoms and n for an integer of 1–10 wherein the fraction of said component 2 where n=1 ranges from 20–60% by weight, where n=2 ranges from 25–40% by weight, where n=3 ranges from 5–25% by weight, where n=4 ranges from 1–20% by weight, and where $5 \leq n \leq 10$ ranges from 0–15% by weight;

and 1 to 30% of a polymerizable component 3 of a vinyl compound represented by the formula:

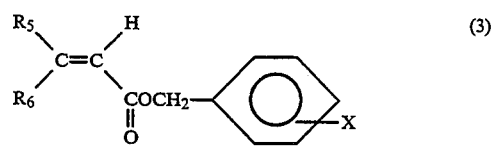

(3)

wherein one of $R_5$ and $R_6$ stands for a hydrogen atom and the other for a grouping:

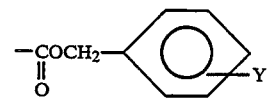

and X and Y are the same or different and stand for a hydrogen atom or a halogen atom other than a fluorine atom.

10. The cast resin defined in claim 9, wherein said polymerizable component 1 is prepared by transesterification reaction between a diallyl phthalate with a dihydric alcohol.

11. The cast resin defined in claim 10, wherein said diallyl phthalate is selected from the group consisting of diallyl phthalate, diallyl isophthalate, diallyl terephthalate, and mixtures thereof.

12. The cast resin defined in claim 10, wherein said dihydric alcohol is selected from the group consisting of ethylene glycol, propylene glycol, 1,3-propane diol, 1,4-butane diol, 1,3-butane diol, neopentyl glycol and mixtures thereof.

13. The cast resin defined in claim 9, wherein said polymerizable component 2 is prepared by transesterification reaction between a diallyl carbonate and dihydric alcohol.

14. The cast resin defined in claim 13, wherein said dihydric alcohol is selected from the group consisting of ethylene glycol, propylene glycol, 1,3-propane diol, 1,4-butane diol, 1,3-butane diol, neopentyl glycol, diethylene glycol, dipropylene glycol and mixtures thereof.

15. The cast resin defined in claim 9 further comprising a vinyl monomer other than said polymerizable components 1, 2 and 3 in an amount of not higher than 10% by weight basted on whole polymerizable components.

16. The cast resin defined in claim 9 wherein said polymerizable component 3 is selected from the group consisting of dibenzyl fumarate, bis-(2-chlorobenzyl) fumarate, bis-(4-chlorobenzyl) fumarate, bis-(4-bromobenzyl) fumarate, bis-(2-bromobenzyl) fumarate, dibenzyl maleate, bis-(2-chlorobenzyl) maleate, bis-(4-chlorobenzyl) maleate, bis-(4-bromobenzyl) maleate, bis-(2-bromobenzyl) maleate and mixtures thereof.

17. The cast resin defined in claim 9 wherein the refractive index and Abbe's number are 1.53 or higher and 30 or higher, respectively.

* * * * *